US009626963B2

(12) United States Patent
Farraro

(10) Patent No.: US 9,626,963 B2
(45) Date of Patent: Apr. 18, 2017

(54) SYSTEM AND METHOD OF IMPROVING SPEECH RECOGNITION USING CONTEXT

(71) Applicant: PayPal, Inc., San Jose, CA (US)

(72) Inventor: Eric J. Farraro, San Jose, CA (US)

(73) Assignee: PAYPAL, INC., San Jose, CA (US)

(*) Notice: Subject to any disclaimer, the term of this patent is extended or adjusted under 35 U.S.C. 154(b) by 204 days.

(21) Appl. No.: 13/874,304

(22) Filed: Apr. 30, 2013

(65) Prior Publication Data

US 2014/0324428 A1 Oct. 30, 2014

(51) Int. Cl.
*G10L 15/06* (2013.01)
*G10L 15/22* (2006.01)
*G10L 25/48* (2013.01)
*G10L 15/30* (2013.01)

(52) U.S. Cl.
CPC .............. *G10L 15/22* (2013.01); *G10L 15/06* (2013.01); *G10L 15/30* (2013.01); *G10L 25/48* (2013.01); *G10L 2015/226* (2013.01)

(58) Field of Classification Search
CPC ....................................................... G10L 15/06
USPC ................................................. 704/231, 244
See application file for complete search history.

(56) References Cited

U.S. PATENT DOCUMENTS

| | | | |
|---|---|---|---|
| 5,708,759 A * | 1/1998 | Kemeny ................. G10L 15/02 704/211 |
| 6,889,189 B2 * | 5/2005 | Boman et al. ................ 704/270 |
| 7,761,296 B1 * | 7/2010 | Bakis et al. ................. 704/247 |
| 8,023,663 B2 * | 9/2011 | Goldberg ............. G10H 1/0025 381/373 |
| 8,254,964 B2 * | 8/2012 | Linden ....................... 455/456.3 |
| 8,255,224 B2 | 8/2012 | Singleton et al. |
| 8,473,289 B2 * | 6/2013 | Jitkoff et al. ................. 704/231 |
| 8,566,087 B2 | 10/2013 | Cross, Jr. et al. |
| RE45,289 E * | 12/2014 | Goldberg et al. ............. 704/233 |
| 2005/0143970 A1 * | 6/2005 | Roth et al. ........................ 704/4 |
| 2007/0100637 A1 * | 5/2007 | McCune ....................... 704/277 |
| 2008/0181417 A1 * | 7/2008 | Pereg et al. .................... 381/17 |
| 2008/0275699 A1 * | 11/2008 | Mozer ........................... 704/231 |
| 2009/0112593 A1 * | 4/2009 | Konig et al. ................. 704/251 |
| 2009/0234651 A1 * | 9/2009 | Basir et al. ................... 704/254 |
| 2010/0082343 A1 * | 4/2010 | Levit et al. ................... 704/257 |
| 2010/0114344 A1 * | 5/2010 | Hannaby ....................... 700/94 |
| 2011/0037596 A1 * | 2/2011 | Farhan .................... G06Q 50/22 340/573.1 |
| 2011/0136542 A1 * | 6/2011 | Sathish ......................... 455/566 |
| 2011/0166856 A1 * | 7/2011 | Lindahl ..................... G10L 15/20 704/233 |
| 2011/0300806 A1 * | 12/2011 | Lindahl ............... G10L 21/0208 455/63.1 |
| 2011/0320114 A1 * | 12/2011 | Buxton et al. ................ 701/200 |
| 2012/0035931 A1 * | 2/2012 | LeBeau et al. ................ 704/251 |
| 2012/0076321 A1 * | 3/2012 | Ring .................... H04R 1/1083 381/94.1 |

(Continued)

*Primary Examiner* — David Hudspeth
*Assistant Examiner* — Oluwadamilola M Ogunbiyi
(74) *Attorney, Agent, or Firm* — Maschoff Brennan

(57) ABSTRACT

A system and method are provided for improving speech recognition accuracy. Contextual information about user speech may be received, and then speech recognition analysis can be performed on the user speech using the contextual information. This allows the system and method to improve accuracy when performing tasks like searching and navigating using speech recognition.

15 Claims, 8 Drawing Sheets

(56) References Cited

U.S. PATENT DOCUMENTS

| | | | | |
|---|---|---|---|---|
| 2012/0224743 A1* | 9/2012 | Rodriguez | .............. | G06T 11/60 |
| | | | | 382/103 |
| 2012/0271631 A1* | 10/2012 | Weng et al. | .................. | 704/243 |
| 2013/0054235 A1* | 2/2013 | Mozer et al. | ................. | 704/233 |
| 2013/0090926 A1* | 4/2013 | Grokop et al. | ............... | 704/243 |
| 2013/0117016 A1* | 5/2013 | Ruwisch | ....................... | 704/225 |
| 2014/0019126 A1* | 1/2014 | Abrams et al. | ............... | 704/235 |
| 2014/0044269 A1* | 2/2014 | Anderson | ........................ | 381/57 |
| 2014/0314242 A1* | 10/2014 | Gollbach | ............. | H04R 1/1041 |
| | | | | 381/71.6 |

\* cited by examiner

SYSTEM AND METHOD OF IMPROVING SPEECH RECOGNITION USING CONTEXT

BACKGROUND

Speech recognition involves the translation of spoken words, typically recorded by a microphone, into text. Speech recognition is used in a variety of different applications. With the rise in popularity of mobile devices, such as smartphones, and of in-dash computing systems utilized in vehicles, there has been an increase in use of speech recognition software. Despite advances in speech recognition algorithms, accuracy of results still remains a problem. As the size of the vocabulary (also known as a dictionary) grows, accuracy declines due to the fact that there are more words that could be confused with one another. Thus, as the number of different applications that utilize speech recognition grows, there is a desire to provide for larger and larger vocabularies.

DETAILED DESCRIPTION

The description that follows includes illustrative systems, methods, techniques, instruction sequences, and computing machine program products that embody illustrative embodiments. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

Although the present embodiments have been described with reference to specific example embodiments, it will be evident that various modifications and changes may be made to these embodiments without departing from the broader spirit and scope of the embodiments. Accordingly, the specification and drawings are to be regarded in an illustrative rather than a restrictive sense.

In an example embodiment, contextual information may be utilized to improve speech recognition. Contextual information is information derived from data other than the speech itself, but that provides context to the speech. This may include, for example, information about the location of the user, temperature and weather, ambient noises, time of day, speed, acceleration, etc. It should be noted that while some definitions of the term "context" may be broad enough to encompass other phrases spoken during the same sentence or paragraph, for purposes of this disclosure context will be limited to non-speech information. For example, words spoken just before or just after an analyzed word, while potentially useful in aiding in the determination of what the analyzed word is, shall not be considered contextual information for the analyzed word for purposes of this disclosure.

In some example embodiments, the contextual information is information gathered from a different sensor than the sensor detecting the speech. For example, the contextual information may be information derived from a global positioning system (GPS) module in a mobile device having a microphone that is recording the speech. In other embodiments, the contextual information is gathered from the same sensor detecting the speech, but the contextual information itself is not speech, such as ambient sounds or music playing in the background while a user is speaking.

In some example embodiments, the detected speech is used to perform searches. These searches may include, for example, general Internet queries, or specific marketplace queries on one or more specific ecommerce sites. Searching, however, is merely one example of potential applications for the techniques described in this disclosure.

Figure 1:
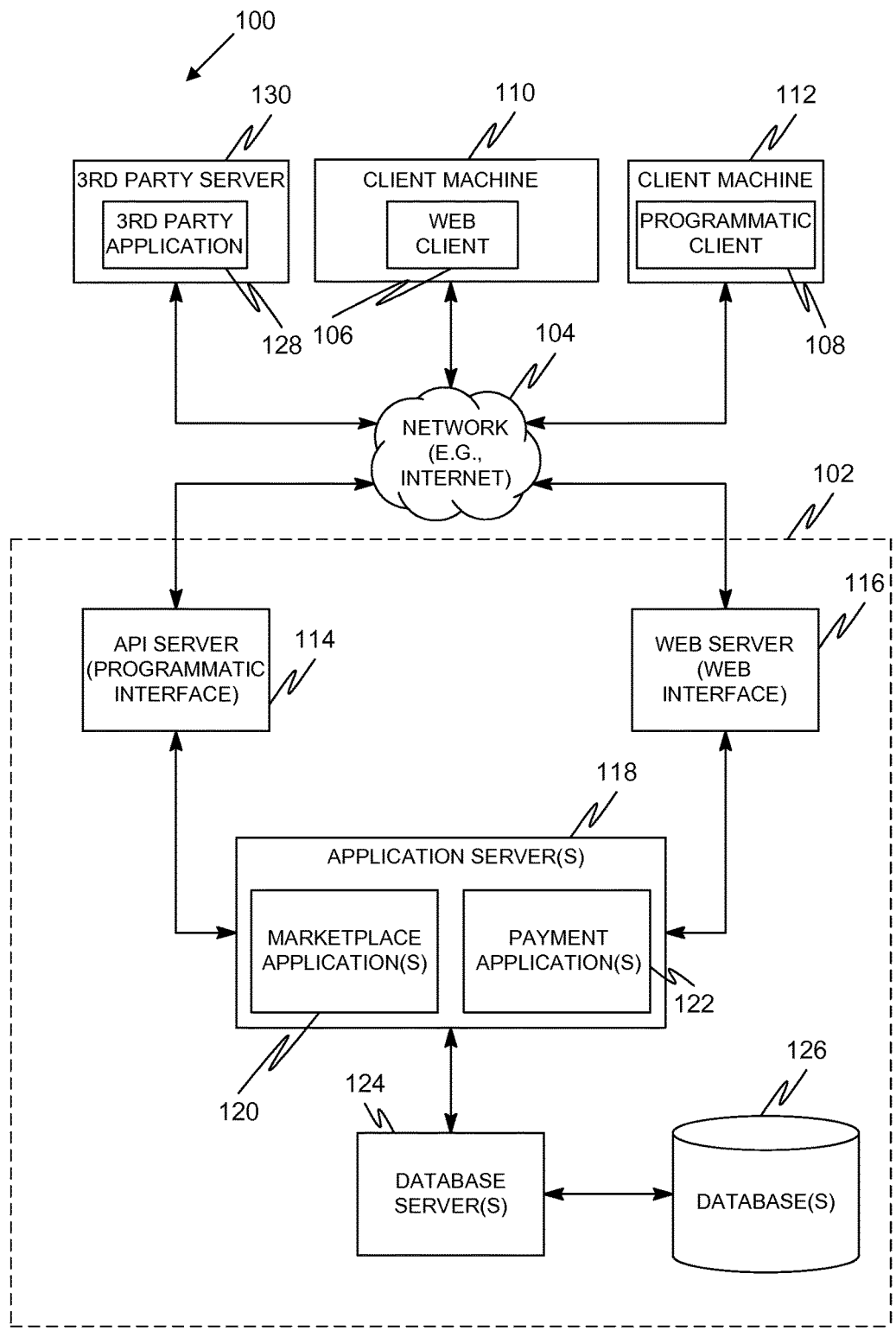
FIG. 1 is a network diagram depicting a client-server system, within which one example embodiment may be deployed.

FIG. 1 is a network diagram depicting a client-server system 100, within which one example embodiment may be deployed. A networked system 102, in the example forms of a network-based marketplace or publication system, provides server-side functionality, via a network 104 (e.g., the Internet or Wide Area Network (WAN)) to one or more clients. FIG. 1 illustrates, for example, a web client 106 (e.g., a brows and a programmatic client 108 executing on respective client machines 110 and 112.

An Application Program Interface (API) server 114 and a web server 116 are coupled to, and provide programmatic and web interfaces respectively to, one or more application servers 118. The application servers 118 host one or more marketplace applications 120 and payment applications 122. The application servers 118 are, in turn, shown to be coupled to one or more database servers 124 that facilitate access to one or more databases 126.

The marketplace applications 120 may provide a number of marketplace functions and services to users that access the networked system 102. The payment applications 122 may likewise provide a number of payment services and functions to users. The payment applications 122 may allow users to accumulate value (e.g., in a commercial currency, such as the U.S. dollar, or a proprietary currency, such as "points") in accounts, and then later to redeem the accumulated value for products (e.g., goods or services) that are made available via the marketplace applications 120. While the marketplace and payment applications 120 and 122 are shown in FIG. 1 to both form part of the networked system 102, it will be appreciated that, in alternative embodiments, the payment applications 122 may form part of a payment service that is separate and distinct from the networked system 102.

Further, while the system 100 shown in FIG. 1 employs a client-server architecture, the present disclosure is of course not limited to such an architecture, and may equally well find application in a distributed, or peer-to-peer, architecture system, for example. The various marketplace and payment applications 120 and 122 may also be implemented as standalone software programs, which do not necessarily have networking capabilities.

The web client 106 accesses the various marketplace and payment applications 120 and 122 via the web interface supported by the web server 116. Similarly, the programmatic client 108 accesses the various services and functions provided by the marketplace and payment applications 120 and 122 via the programmatic interface provided by the API server 114. The programmatic client 108 may, for example, be a seller application (e.g., the TurboLister application developed by eBay Inc., of San Jose, Calif.) to enable sellers to author and manage listings on the networked system 102 in an off-line manner, and to perform batch-mode communications between the programmatic client 108 and the networked system 102.

FIG. 1 also illustrates a third party application 128, executing on a third party server machine 130, as having programmatic access to the networked system 102 via the programmatic interface provided by the API server 114. For example, the third party application 128 may, utilizing information retrieved from the networked system 102, support one or more features or functions on a website hosted by the third party. The third party website may, for example, provide one or more promotional, marketplace, or payment functions that are supported by the relevant applications of the networked system 102.

Figure 2:
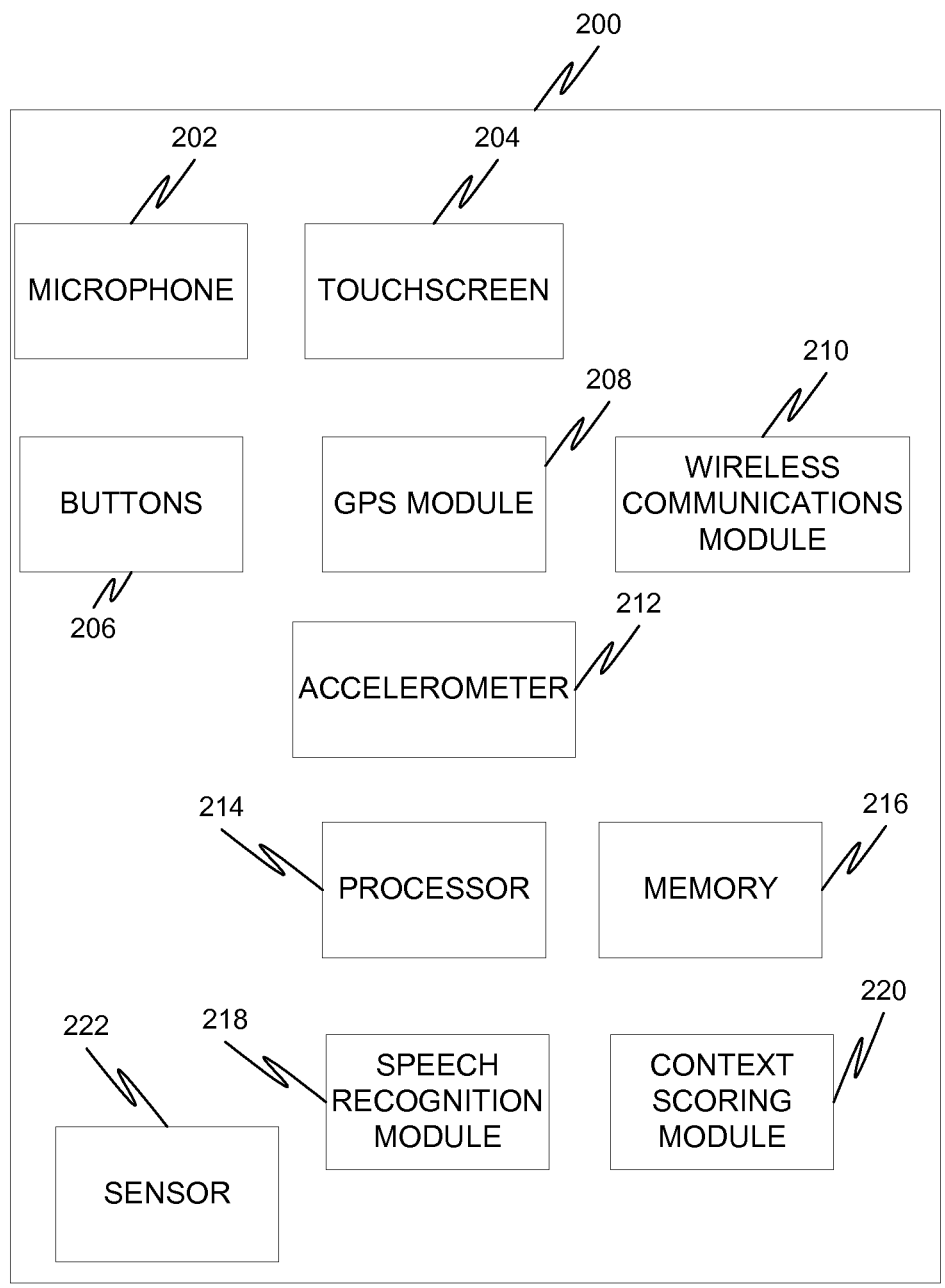
FIG. 2 is a block diagram illustrating a mobile device in accordance with a example embodiment.

FIG. 2 is a block diagram illustrating a mobile device 200 in accordance with an example embodiment. The mobile device 200 may contain a microphone 202, a touchscreen 204, and one or more physical buttons 206. In some example embodiments, the mobile device 200 may also contain a global positioning system module 208, a wireless communications module 210, and an accelerometer 212. The wireless communications module 210 may be designed to communicate wirelessly via any number of different wireless communications standards, including cellular communications such as Code Division Multiple Access (CDMA) and Global System for Mobile Communications (GSM), 3G, 4G, LTE, WiFi, Bluetooth, WiMax, etc. The mobile device 200 may also include a processor 214 and a memory 216. The memory 216 may include any combination of persistent (e.g., hard drive) and/or non-persistent (e.g., Random Access Memory (RAM)) storage.

Speech recognition may be performed by, for example, recording user speech using the microphone 202. The speech recognition itself may be performed with a speech recognition module 218 using any number of different speech recognition algorithms, including acoustic modeling, language modeling, and hidden Markov models. Hidden Markov models are statistical models that output a sequence of symbols or quantities. A speech signal can be viewed as a piecewise stationary signal or a short-time stationary signal. In short time scales, speech can be approximated as a stationary process. Hidden Markov models can be trained automatically, and can output a sequence of n-dimensional real-valued vectors (with n being a small integer, such as 10), outputting these repeatedly at short intervals (e.g., every 10 milliseconds. The vectors may comprise cepstral coefficients, which are obtained by taking a Fourier transform of a short time window of speech and decorrelating the spectrum using a cosine transform, then taking the most significant coefficients. The hidden Markov model will tend to have in each state a statistical distribution that is a mixture of diagonal covariance Gaussians, which will give a likelihood for each observed vector. Each word or phoneme may have a different output distribution. A hidden Markov model for a sequence of words or phonemes is made by concatenating the individual trained hidden Markov models for the separate words and phonemes.

These algorithms may also be combined in various combinations to further improve speech recognition. Cepstral normalization may be utilized to normalize for different speaker and recording conditions, and techniques such as vocal tract length normalization and maximum likelihood linear regression may also be used. Further techniques such as heteroscedastic linear discriminant analysis, global semi-tied covariance transforms, and discriminative training techniques such as maximum mutual information, minimum classification error, and minimum phone error can also be used.

In an example embodiment, scores or other outputs derived from one or more of these speech recognition techniques may be weighted along with information derived from contextual information. This may be performed by or with a context scoring module 220. The context information may be derived from ambient sounds from the microphone 202, or alternatively may be derived from one or more sensors 222. This acts to alter the results of the speech recognition techniques based on the contextual information.

Various specific example embodiments will now be described.

Figure 3:
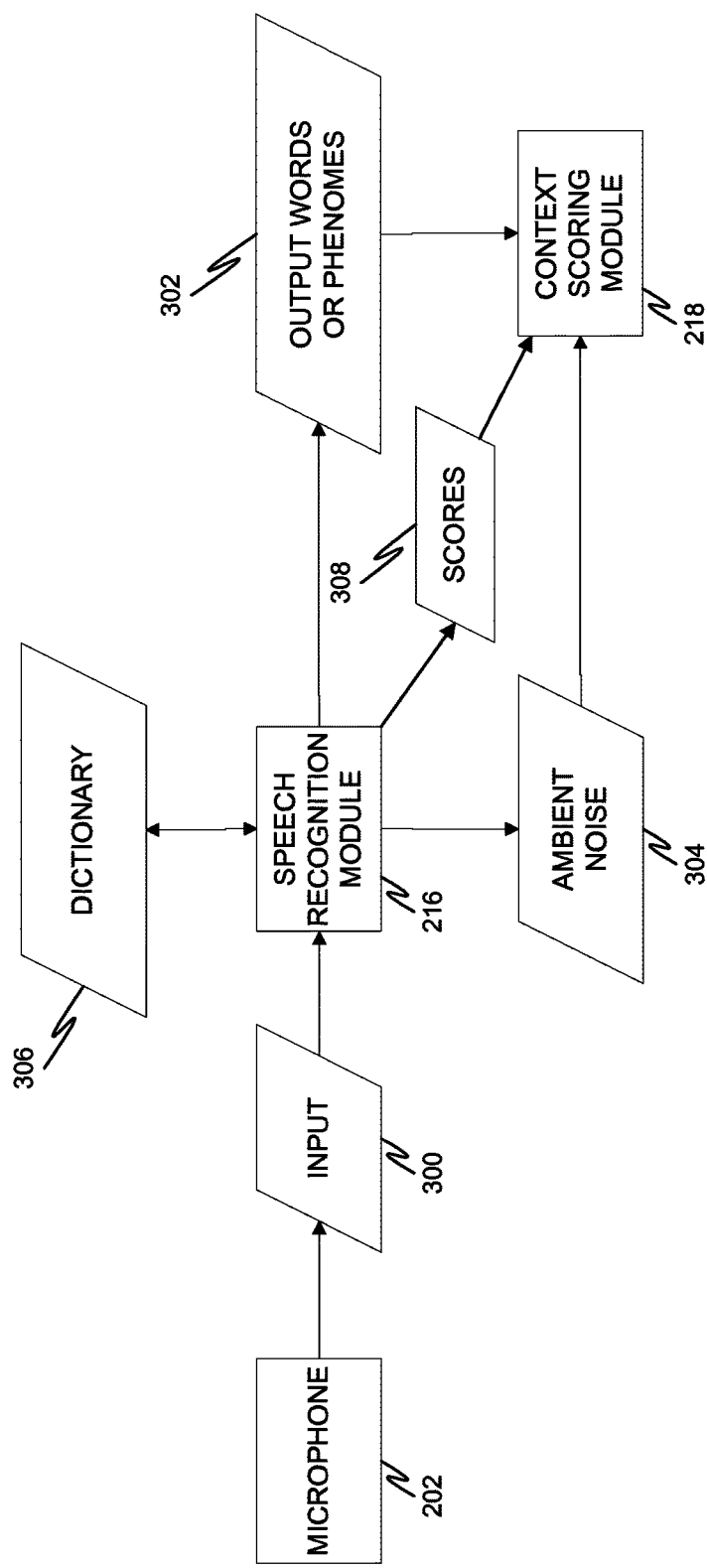
FIG. 3 is a block diagram illustrating ambient noise being used to improve speech recognition in accordance with an example embodiment.

FIG. 3 is a block diagram illustrating ambient noise being used to improve speech recognition in accordance with an example embodiment. Here, microphone 202 records input 300. This input 300 may be passed to speech recognition module 216, which may act to analyze the input and derive one or more potential output words or phonemes 302 from the input 300. Any of the input that is not determined to be a potential output word or phoneme 302 may be considered to be ambient noise 304. The speech recognition module 216 may perform this analysis by comparing the input 300 to various waveforms stored for a dictionary 306. These waveforms may be stored in memory 214 (shown in FIG. 2). It should be noted that while in this example embodiment the speech recognition module 216 and the memory 214 are depicted on the same device as the microphone 202, in some example embodiments some or all of the speech recognition processes and storage may be performed and/or located on a separate device, such as a server.

Also output from the speech recognition module 216 may be various scores 308 for the potential output words or phonemes 302. These scores 308 may indicate the likelihood that each particular output word or phoneme 302 accurately reflects what the user was saying. A context scoring module 218 may then take these scores 308 and modify them based on an analysis of the ambient noise 304. This may include, for example, comparing the ambient noise 304 to various stored waveforms to identify the ambient noise 304 and then altering the values of one or more scores 308 based on these identifications. In another example embodiment, rather than modify the scores 308 directly, the context scoring module 218 alters the dictionary 306 and the speech recognition module 216 reperforms the speech analysis using the modified dictionary 306. The dictionary modification may include replacing the dictionary 306 with an alternate dictionary more appropriate in light of the ambient noise 304, or modifying entries in the dictionary 306 based on the ambient noise 304. In some example embodiments, the modifications to the dictionary 306 may be temporary, for example, expiring once the particular ambient noise is discontinued.

In an example embodiment, the ambient noise 304 may include music. The analysis in the context scoring module 218 may include identifying the music being played. Any terms that are related to the identified music, such as the song title, artist, album title, genre, lyrics, band members, etc. may be either weighted more heavily or added to the dictionary 306. Other terms related generally to music (e.g., tickets, concert, billboard, etc.) also may be weighted more heavily or added to the dictionary 306. The presumption is that the user may be more likely to be speaking words related to music in general, or this particular piece of music, while the music is playing in the backroom. This is especially true of situations where the user is attempting to perform a search using speech recognition.

In another example embodiment, the ambient noise 304 may include background sounds. Examples include birds chirping, a baby crying, traffic noises, etc. If this ambient noise 304 can be identified, then this information can be used to improve the speech recognition accuracy. For example, a user performing a search while a baby is crying in the background may be more likely to be searching for baby or child related items or pieces of information. Terms related to babies or children may therefore be weighted more heavily or added to the dictionary 306. Likewise, a user performing a search while birds chirp in the background may be more likely to be performing a search about birds, and thus bird-related terms may be weighted more heavily or added to the dictionary 306. The more specifically the context scoring module 218 can identify the ambient sounds, the more specific the terms may be added. For example, bird species may be identified if there are enough sample bird calls accessible during the context analysis. If a specific bird species is identified, terms related to this specific species, in addition to birds generally, could be weighted more heavily or added to the dictionary 306.

Figure 4:
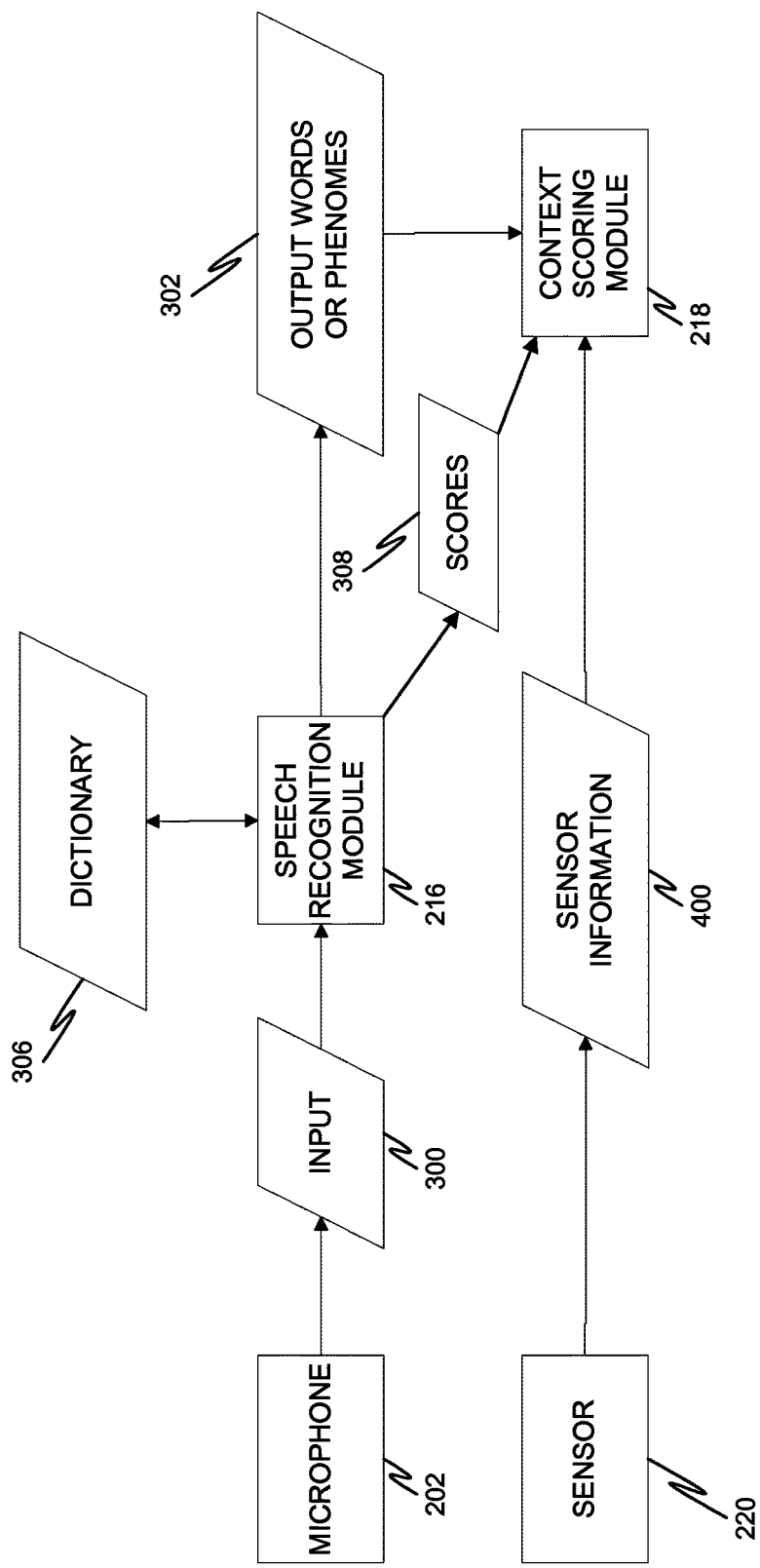
FIG. 4 is a block diagram illustrating information from one or more sensors other than a microphone being used to improve the accuracy of speech recognition.

FIG. 4 is a block diagram illustrating information from one or more sensors other than a microphone being used to improve the accuracy of speech recognition. Here, a sensor 220 may detect sensor information, which is then input to a context scoring module 218. As with FIG. 3, the speech recognition module 216 may obtain recorded sounds from a microphone 202, and output various potential words or phonemes 302 and scores 308. The context scoring module 218 may then take these scores 308 and modify them based on an analysis of the sensor information 400. This may include, for example, identifying aspects of the sensor information 400 to alter the values of one or more scores 308 based on these aspects. The exact implementation of these aspects may vary greatly based on the type of sensor 220 utilized.

In an example embodiment, the sensor 220 may be a GPS module, and the aspect of the GPS information may be a location. This location may be further cross-referenced against map information or other information that may provide more contextual information than the location alone. For example, the map may be used to determine whether the location is inside or outside, at home or at work, in a new or foreign city, etc. The scores 308 may then be modified based on this contextual information. For example, if the user is in a new city or foreign city, chances are their query may be regional in nature. Local points of interests, restaurants, lingo, etc. could be weighted more heavily and/or added to a dictionary.

In another example embodiment, the GPS module 206 is used to detect a speed of the user. A user traveling at, for example, 65 miles per hour, is more likely to be performing searches about directions or guidance than if the same user was not moving. The dictionary and/or scores could then be modified to reflect this knowledge.

In another example embodiment, rather than modify the scores 308 directly, the context scoring module 218 alters the dictionary 306 and the speech recognition module 216 reperforms the speech analysis using the modified dictionary 306. The dictionary modification may include replacing the dictionary 306 with an alternate dictionary more appropriate in light of the sensor information 400, or modifying entries in the dictionary 306 based on the sensor information 400. In some example embodiments, the modifications to the dictionary 306 may be temporary, for example, expiring once the particular ambient noise is discontinued.

Figure 5:
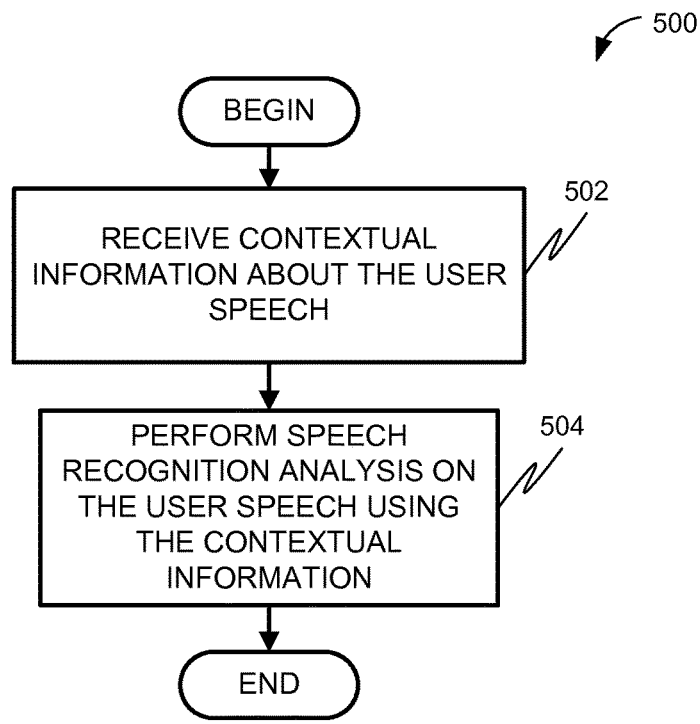
FIG. 5 is a flow diagram illustrating a method, in accordance with an example embodiment, of improving accuracy of speech recognition.

FIG. 5 is a flow diagram illustrating a method 500, in accordance with an example embodiment, of improving accuracy of speech recognition. At operation 502, contextual information about user speech is received. At operation 504, speech recognition analysis is performed on the user speech, wherein the speech recognition analysis uses the contextual information.

Figure 6:
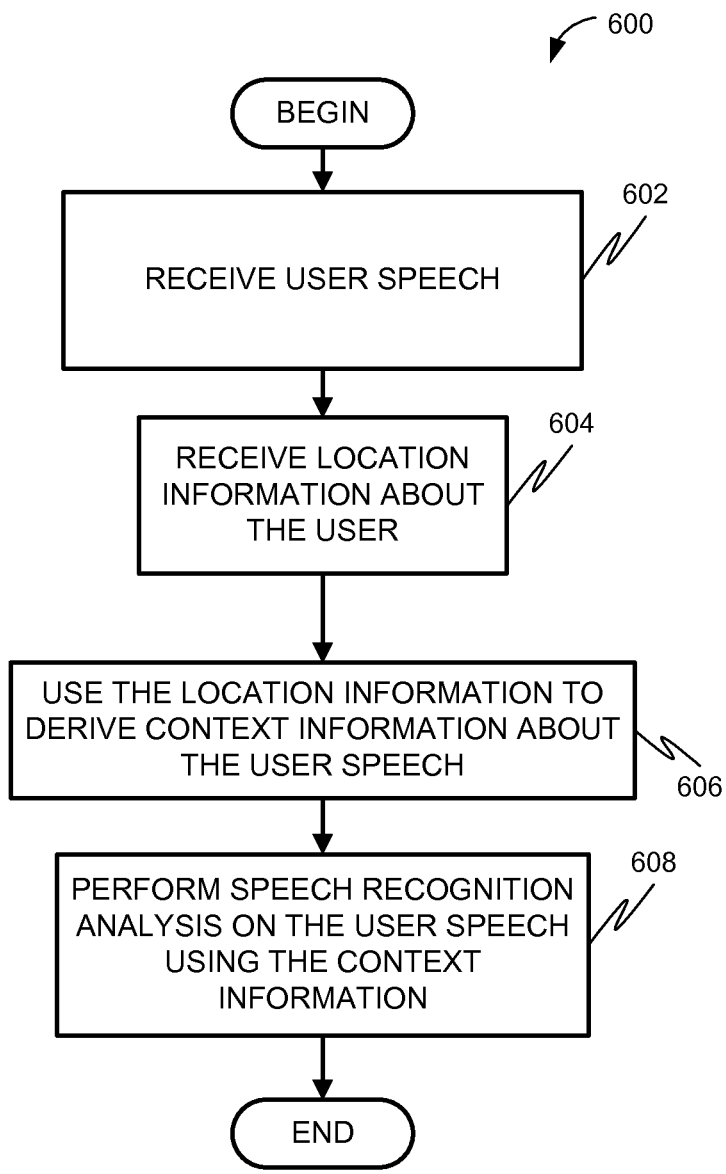
FIG. 6 is a flow diagram illustrating a method, in accordance with another example embodiment, of improving accuracy of speech recognition.

FIG. 6 is a flow diagram illustrating a method 600, in accordance with another example embodiment, of improving accuracy of speech recognition. At operation 602, user speech is received. This may either be received from another device, such as a mobile device, or may be received directly through a microphone on the device performing the method 600. The user speech is speech spoken by a user. At operation 604, location information is received about the user. This may include, for example, GPS coordinates of the location of a device operated by the user. At operation 606, the location information may be utilized to derive context information about the user speech. This may include, for example, analyzing the location information using preset rules or settings that provide some information about the location that is relevant to the analysis of the user speech. This may include, for example, identification of the location within geographic boundaries (e.g., regions, states, cities, streets, etc.), identification of the location with respect to preset locations frequented by the user (e.g., home, work, etc.), identification of the location with respect to points of interest (e.g., lakes, museums, etc.), and the like. At operation 608, the context information may be used when performing speech recognition analysis on the user speech.

Figure 7:
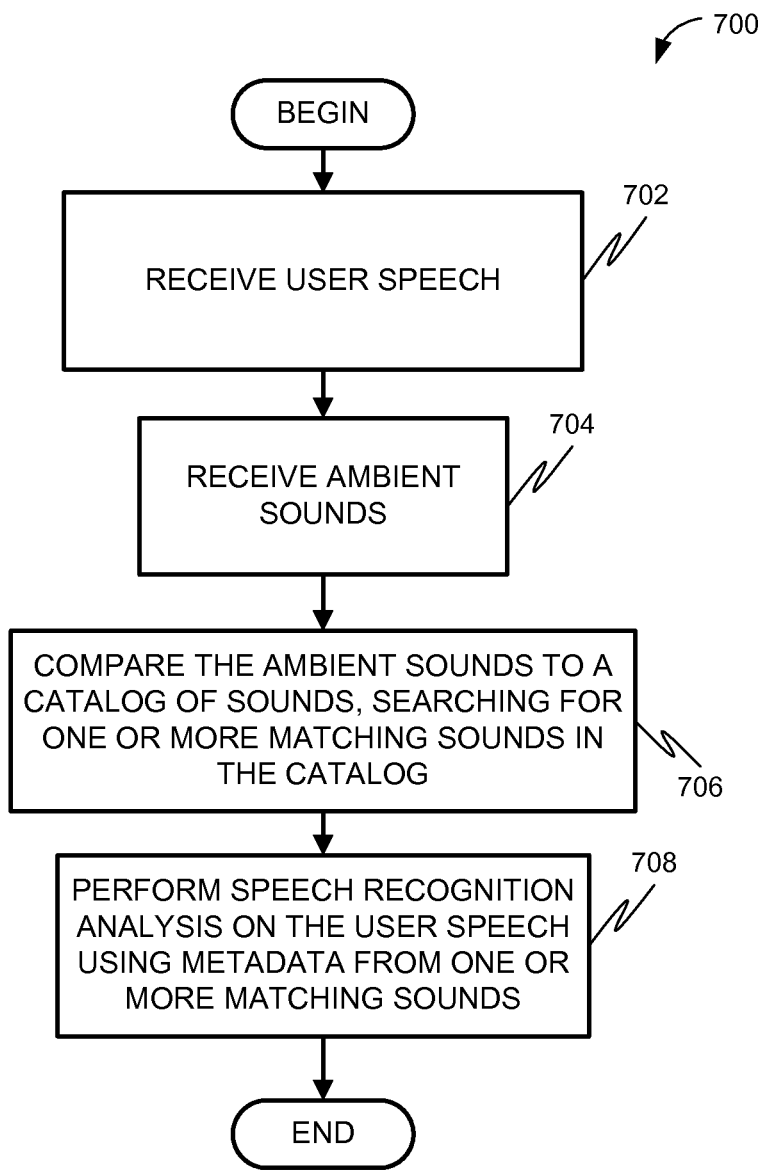
FIG. 7 is a flow diagram illustrating a method, in accordance with another example embodiment, of improving accuracy of speech recognition.

FIG. 7 is a flow diagram illustrating a method 700, in accordance with another example embodiment, of improving accuracy of speech recognition. At operation 702, user speech is received. This may either be received from another device, such as a mobile device, or may be received directly through a microphone on the device performing the method 700. The user speech is speech spoken by a user. At operation 704, ambient sounds may be received. This may either be received from another device, such as a mobile device, or may be received directly through a microphone on the device performing the method 700. The ambient sounds reflect non-user speech recorded by the same microphone as the user speech. At operation 706, the ambient sounds may be compared to a catalog of sounds, searching for one or more matching sounds in the catalog. This catalog may contain background sounds, music, non-user speech, or other types of sounds. This catalog may not just contain matching sounds, but contain some metadata about each sound. This may include, for example, an identification of the sounds, or other types of information about the sounds.

At operation 708, metadata from one or more matching sounds is used when performing speech recognition analysis on the user speech.

Figure 8:
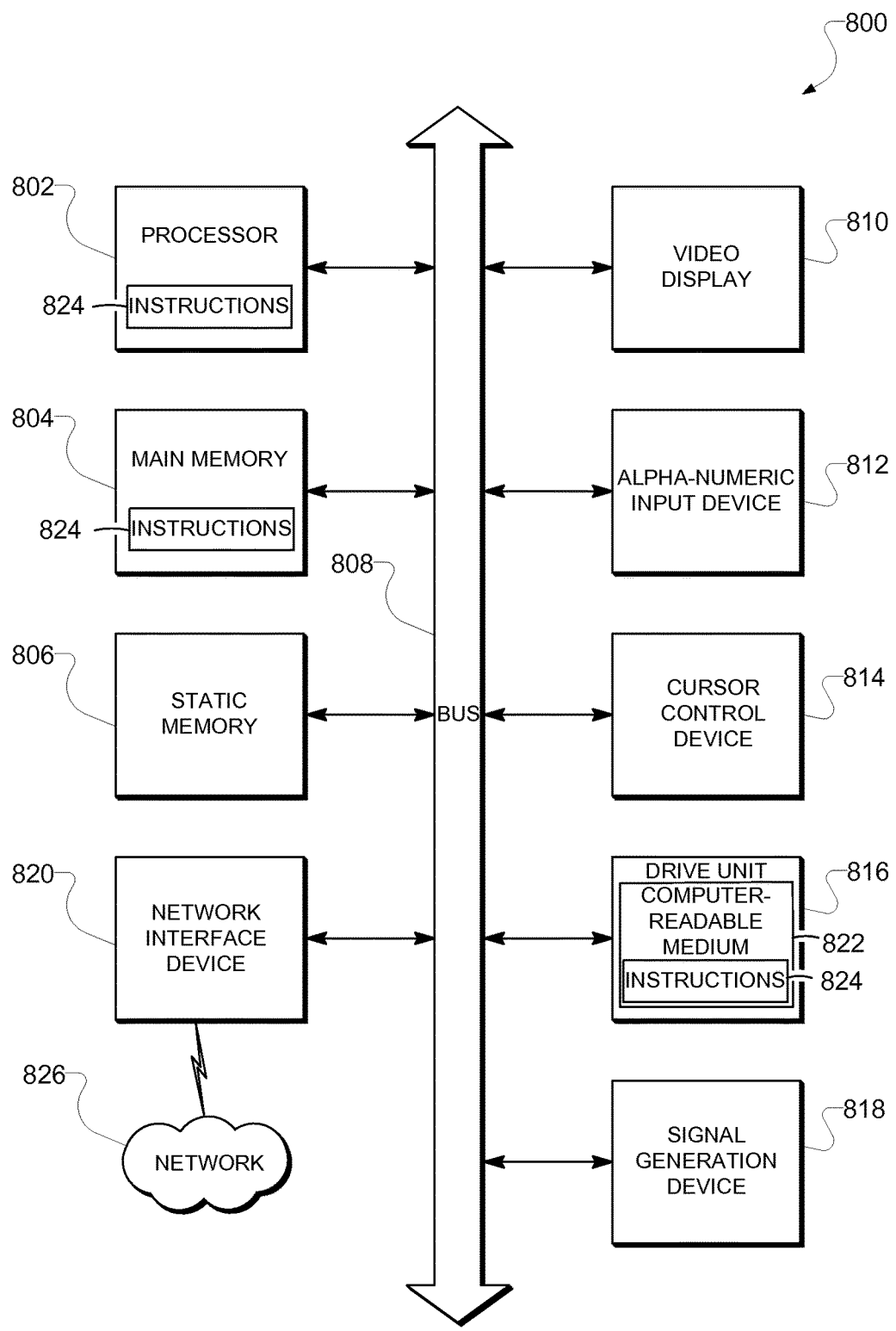
FIG. 8 shows a diagrammatic representation of a machine in the example form of a computer system within which a set of instructions for causing the machine to perform any one or more of the methodologies discussed herein may be executed.

FIG. 8 shows a diagrammatic representation of a machine in the example form of a computer system 800 within which a set of instructions 824 for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a personal digital assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 800 includes a processor 802 (e.g., a central processing unit (CPU), a graphics processing unit (GPU), or both), a main memory 804 and a static memory 806, which communicate with each other via a bus 808. The computer system 800 may further include a video display unit 810 (e.g., a liquid crystal display (LCD) or a cathode ray tube (CRT)). The computer system 800 also includes an alphanumeric input device 812 (e.g., a keyboard), a cursor control device 814 (e.g., a mouse), a disk drive unit 816, a signal generation device 818 (e.g., a speaker), and a network interface device 820.

The disk drive unit 816 includes a non-transitory computer-readable medium 822 on which is stored one or more sets of instructions 824 (e.g., software) embodying any one or more of the methodologies or functions described herein. The instructions 824 may also reside, completely or at least partially, within the main memory 804 and/or within the processor 802 during execution thereof by the computer system 800, with the main memory 804 and the processor 802 also constituting machine-readable media. The instructions 824 may further be transmitted or received over a network 826 via the network interface device 820.

While the machine-readable medium 822 is shown in an example embodiment to be a single medium, the term "machine-readable medium" should be taken to include a single medium or multiple media (e.g., a centralized or distributed database, and/or associated caches and servers) that store the one or more sets of instructions 824. The term "machine-readable medium" shall also be taken to include any medium that is capable of storing, encoding or carrying a set of instructions for execution by the machine and that cause the machine to perform any one or more of the methodologies described herein. The term "machine-readable medium" shall accordingly be taken to include, but not be limited to, solid-state memories, optical and magnetic media, and carrier wave signals.

Although the inventive concepts have been described with reference to specific example embodiments, it will be evident that various modifications and changes may be made to these embodiments without departing from the broader spirit and scope of the inventive concepts. Accordingly, the specification and drawings are to be regarded in an illustrative rather than a restrictive sense.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

The invention claimed is:

1. A system, comprising:
a processor;
a single microphone configured to both record user speech and to record ambient sounds; and
a speech recognition module configured to:
identify that the ambient sounds are of a particular type by comparing the ambient sounds to stored waveforms;
select a dictionary based on the identified particular type of ambient sounds;
identify, as contextual information, terms related to the identified particular type of ambient sounds based on identification of the identified particular type of ambient sounds, the terms being generated as contextual information;
alter, in response to identification of the terms related to the identified particular type of ambient sounds, the dictionary such that the dictionary includes the terms related to the identified particular type of ambient sounds;
assign, in the dictionary, score values to the terms related to the identified particular type of ambient sounds based on identifying that the terms are related to the identified particular type of ambient sounds; and
analyze the user speech by comparing each potential output word or phoneme in the user speech to waveforms stored for the dictionary to attempt to match the potential output word or phoneme to a waveform corresponding to a particular word or phoneme in the dictionary, an analysis varying based on the assigned scores to the terms identified as contextual information.

2. The system of claim 1, wherein the ambient sounds include music and the identification that the ambient sounds are of the particular type includes identifying that the ambient sounds are music and identifying the music, wherein the speech recognition module is further configured to retrieve identify, as the contextual information, terms related to the identified music.

3. The system of claim 1, further comprising a sensor, and wherein the contextual information includes information identified from sensor information detected by the sensor.

4. The system of claim 3, wherein the sensor is a global positioning system module and the contextual information includes location.

5. The system of claim 3, wherein the sensor is a global positioning system module and the contextual information includes speed.

6. A method comprising:
recording sounds using a single microphone;
identifying, using one or more processors, potential output words and phonemes as well as ambient sounds in the sounds recorded by the single microphone;
identifying that the ambient sounds are of a particular type by comparing the ambient sounds to stored waveforms;
selecting a dictionary based on the identified particular type of ambient sounds;
identifying, as contextual information, terms related to the identified particular type of ambient sounds based on identification of the identified particular type of ambient sounds, the terms being generated as contextual information;
assigning, in the dictionary, score values to the terms related to the identified particular type of ambient sounds based on identifying that the terms are related to the identified particular type of ambient sounds; and
analyzing user speech by comparing each potential output word or phoneme in the user speech to waveforms stored for the dictionary to attempt to match the potential output word or phoneme to a waveform corresponding to a particular word or phoneme in the dictionary, the analyzing varying based on the assigned scores to the terms identified as contextual information.

7. The method of claim 6, wherein the contextual information includes user location.

8. The method of claim 6, wherein the contextual information includes speed of movement of a user.

9. The method of claim 6, wherein the ambient sounds include music and the identification that the ambient sounds are of the particular type includes identifying that the ambient sounds are music and identifying the music, wherein the speech recognition module is further configured to identify, as the contextual information, terms related to the identified music.

10. The method of claim 6, further comprising altering the dictionary based on the contextual information such that the dictionary includes the terms related to the identified particular type of ambient sounds.

11. The method of claim 10, wherein the dictionary is altered by replacing the dictionary with a different dictionary.

12. The method of claim 10, wherein the dictionary is altered by adding words pertaining to the contextual information to the dictionary.

13. A non-transitory machine-readable storage medium comprising a set of instructions which, when executed by a processor, causes execution of operations comprising:
recording sounds using a single microphone;
identifying potential output words and phonemes as well as ambient sounds in the sounds recorded by the single microphone;
identifying that the ambient sounds are of a particular type by comparing the ambient sounds to stored waveforms;
selecting a dictionary based on the identified particular type of ambient sounds;
identifying, as contextual information, terms related to the identified particular type of ambient sounds based on identification of the identified particular type of ambient sounds, the terms being generated as contextual information;
assigning, in the dictionary, score values to the terms related to the identified particular type of ambient sounds based on identifying that the terms are related to the identified particular type of ambient sounds; and
analyzing the user speech by comparing each potential output word or phoneme in the user speech to waveforms stored for the dictionary to attempt to match the potential output word or phoneme to a waveform corresponding to a particular word or phoneme in the dictionary, the analyzing varying based on the assigned scores to the terms identified as contextual information.

14. The non-transitory machine-readable storage medium of claim 13, wherein the speech recognition analysis includes utilizing a hidden Markov model.

15. The non-transitory machine-readable storage medium of claim 13, wherein the ambient sounds include music and the identification that the ambient sounds are of the particular type includes identifying that the ambient sounds are music and identifying the music, wherein the speech recognition module is further configured to identify, as the contextual information, terms related to the identified music.

* * * * *